July 28, 1953
B. WALKER
2,647,012
AUTOMOTIVE VEHICLE LUGGAGE COMPARTMENT
AND SPARE WHEEL CARRIER
Filed Oct. 23, 1946
3 Sheets-Sheet 1
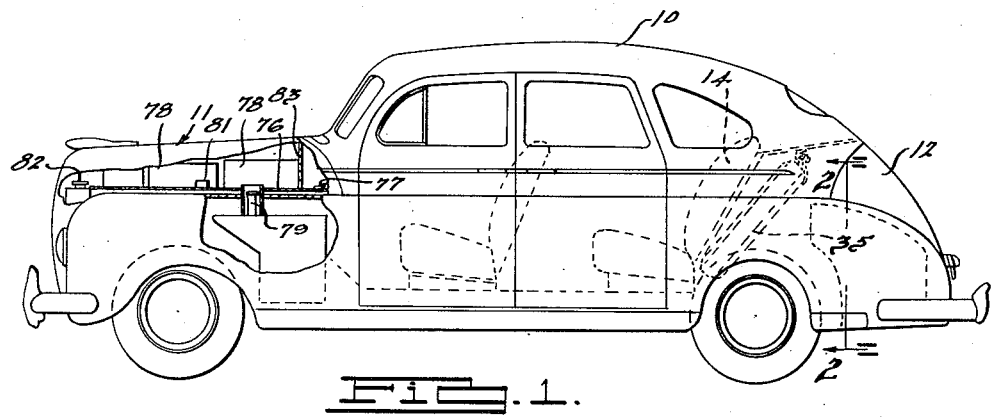
INVENTOR.
Brooks Walker.
BY
Harness, Dickey & Pierce
ATTORNEYS.

July 28, 1953
B. WALKER
2,647,012
AUTOMOTIVE VEHICLE LUGGAGE COMPARTMENT
AND SPARE WHEEL CARRIER
Filed Oct. 23, 1946
3 Sheets-Sheet 2
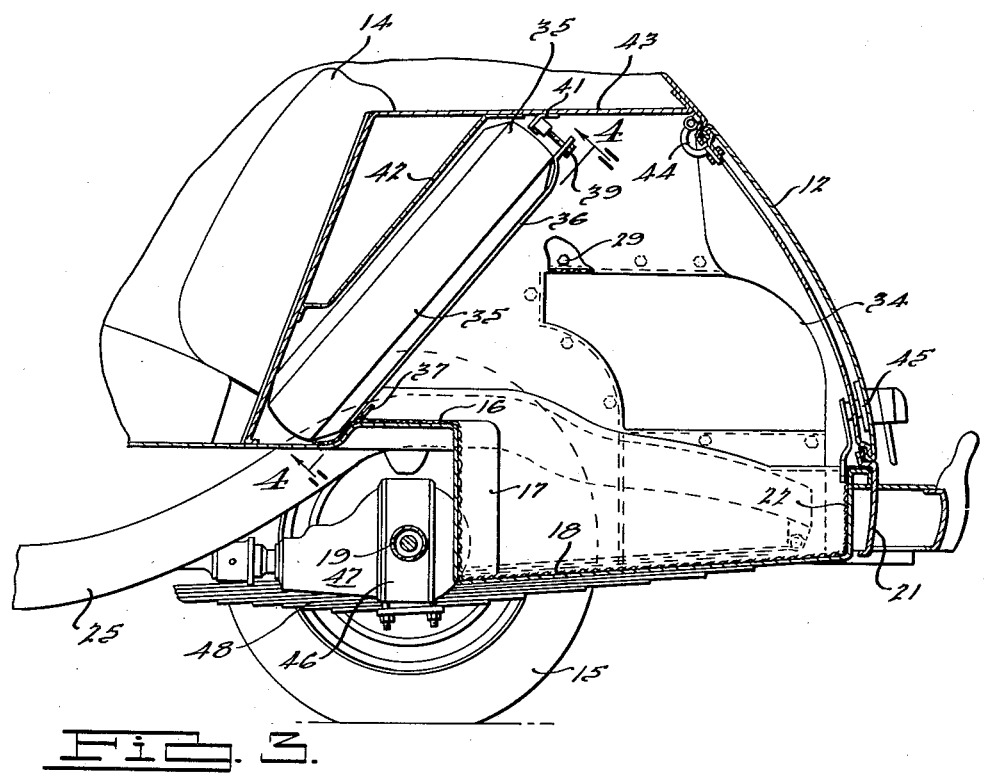
Fig. 3.
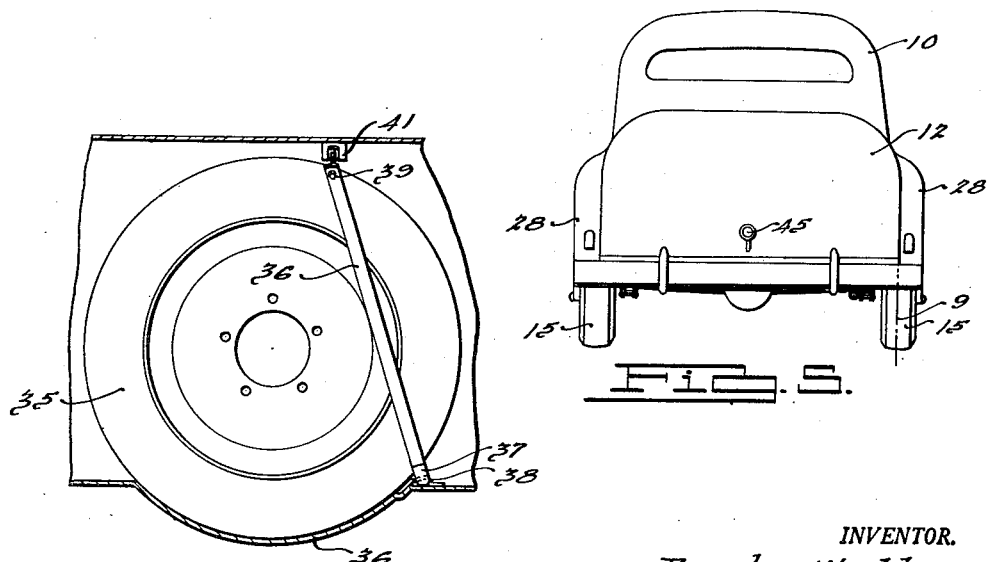
Fig. 4.
Fig. 5.
INVENTOR.
Brooks Walker.
BY
Harness, Dickey & Pierce.
ATTORNEYS.

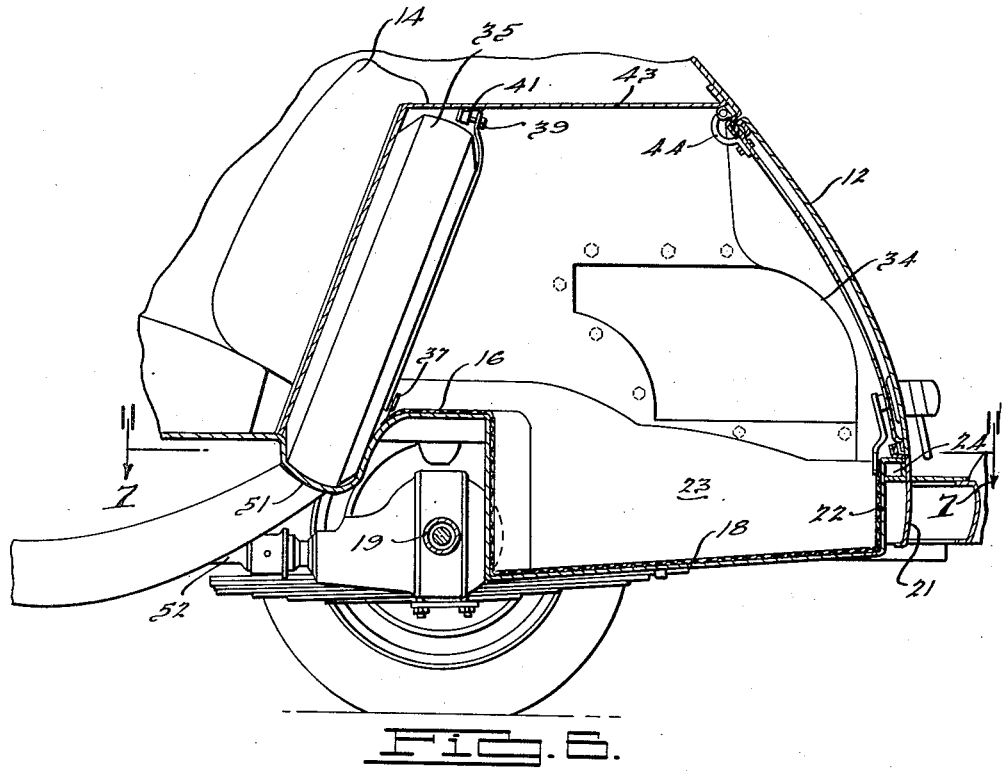
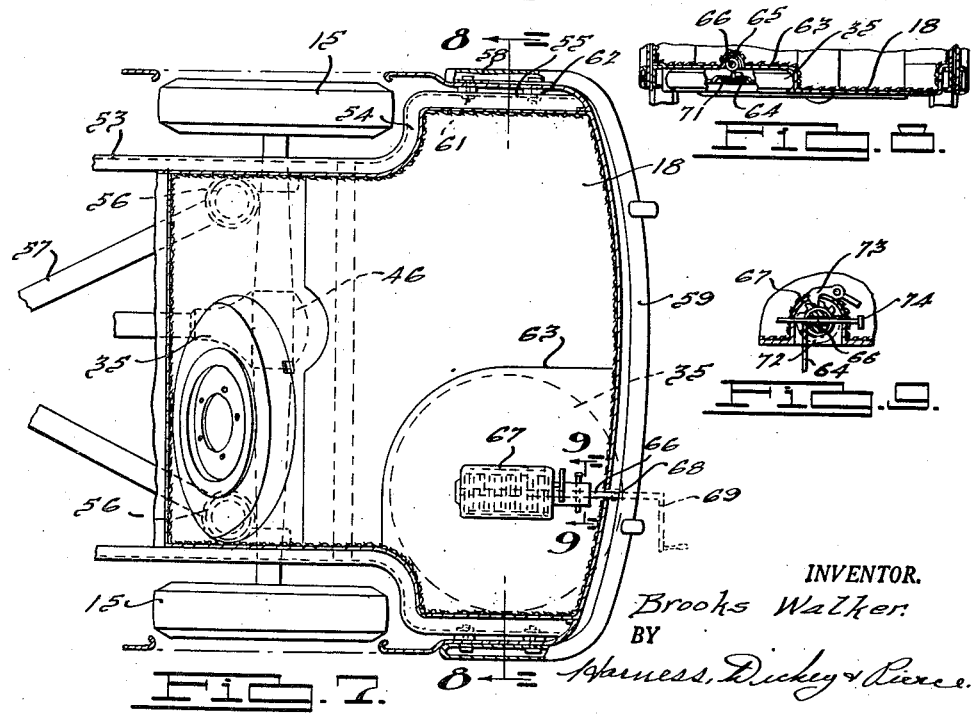

Patented July 28, 1953

2,647,012

UNITED STATES PATENT OFFICE 2,647,012

AUTOMOTIVE VEHICLE LUGGAGE COMPARTMENT AND SPARE WHEEL CARRIER

Brooks Walker, Piedmont, Calif.

Application October 23, 1946, Serial No. 705,090

6 Claims. (Cl. 296—37.2)

This invention relates to automobile bodies having enlarged storage capacity and particularly to a body having the available space thereof enlarged for the storage of luggage and like articles.

The storage compartment on the floor of the rear end of the body extended from the body kick-up portion which cleared the differential and rear axle, which substantially limited the depth of the compartment. The compartment was further reduced in area by the wheel housings and the spare tire which was stored therein, either by standing on edge along one side of the compartment or resting upon the floor of the compartment.

The present invention pertains to a vehicle body having enlarged storage space, that at the rear of the body being substantially increased in cubical area by having the floor dropped downwardly a maximum amount to the lowest permissible limit. Additionally, the area outwardly of the frame and in rear of the wheel housing was formed in separate compartments opening into the main storage compartment to provide further storage area. It was contemplated that the battery for the ignition and lighting system could be housed in one of the compartments outwardly of the chassis frame while the other compartment on the opposite side of the car could house the tools and like accessories. Provision was made for mounting the spare wheel substantially parallel to the back seat against the forward wall of the compartment, leaving the central area free for the reception of luggage and like articles. The available space for the storage of luggage and like articles has been substantially doubled by this construction. It is within the purview of the invention to mount the wheel beneath the floor and to extend the chassis frame laterally in rear of the rear wheels for enlarging the compartment at the rear end thereof. Such a construction would eliminate the separate compartments above referred to which are provided outwardly of the chassis frame.

It is also within the purview of this invention to utilize the area under the hood for storage of luggage and like articles by providing a platform over the top of the engine beneath the hood. The platform may be provided with apertures through which the intake pipe for gasoline, water and oil may extend so that the hood may be raised with the luggage exposed while permitting the water, gas and oil to be replenished. It is to be understood that the platform may be hinged to the hood to be raised therewith so that the car may be serviced in the usual manner. When the luggage is to be removed, the hood may be raised independently of the platform so that the luggage and like articles will be exposed.

Accordingly, the main objects of the invention are: to provide a vehicle body with an enlarged luggage compartment at the rear of the body by lowering the floor to the maximum permissible limit; to provide a luggage compartment in the rear of a vehicle having communicating areas laterally thereof outwardly of the chassis frame in which the battery, tools and like accessories may be carried separate from the luggage compartment; to provide a platform under the hood upon which luggage and like articles may be carried; to provide side rails for a chassis frame which are offset laterally in rear of the rear wheels substantially to the outer body line; to provide width to the floor panel which is lowered to a maximum permissible limit; and, in general, to provide a maximum luggage compartment of a vehicle by utilizing all of the area available within the confines of the body.

Other objects and features of novelty of the invention will be specifically pointed out or will become apparent when referring, for a better understanding of the invention, to the following description taken in conjunction with the accompanying drawings, wherein:

Figure 1 is a broken view in side elevation of a vehicle body embodying features of this invention;

Fig. 2 is an enlarged sectional view of the structure illustrated in Fig. 1, taken on the line 2—2 thereof;

Fig. 3 is a sectional view of the structure illustrated in Fig. 2, taken on the line 3—3 thereof;

Fig. 4 is a sectional view of the structure illustrated in Fig. 3, taken on the line 4—4 thereof;

Fig. 5 is a rear end view of the structure illustrated in Fig. 1;

Fig. 6 is a view of structure, similar to that illustrated in Fig. 3, showing a further form thereof;

Fig. 7 is a sectional view of structure, similar to that illustrated in Fig. 6, when taken on line 7—7 thereof, showing a still further form which the invention may assume;

Fig. 8 is a sectional view of the structure illustrated in Fig. 7, taken on the line 8—8 thereof; and Fig. 9 is a sectional view of the structure illustrated in Fig. 8, taken on the line 9—9 thereof.

The automobile illustrated in Figs. 1 to 5 inclusive has a body 10 of conventional construction having a hood 11 extending forwardly of the body and a deck door 12 at the rear end thereof. The deck door 12 covers a luggage compartment 13 rearwardly of a rear seat 14 and is extended laterally substantially to or past the center line 9 of the wheels 15. In the construction illustrated in Figs. 1 to 6, the kick-up portion 16 of the floor panel is dropped downwardly at 17 to provide a floor panel 18 rearwardly of the rear axle housing 19 and forwardly of the rear terminal body portion 21 disposed in extension of the deck door. The edges of the floor panel 18 are extended upwardly at 22 at the rear and at 23 at the sides and flanged outwardly to extend over the side rails 25 of the chassis frame.

Rearwardly of the rear wheels 15 and in alignment therewith, compartments 26 and 27 are provided inwardly of the fender portions 28 of the body. These may be extensions of the side quarter panels or may be fender portions which are releasably secured to the corner panels by bolts 29, as herein shown. The compartments 26 communicate through an opening 31 into the central luggage compartment which is of a size to permit a battery 32 to be inserted and removed therethrough. A panel 33 is illustrated as being placed over the battery so that the area over the battery in the compartment 26 may also be employed for storage while protecting any articles from the acid of the battery and while assisting in clamping the battery against movement in the compartment.

A vertically disposed opening 34 is provided in the compartment 27 through which articles, such as tools, jacks and other accessories may be placed to separate such articles from any luggage placed in the compartment 13 which are thereby protected from damage through contact with the accessories. The drop floor panel 18 and the compartments 26 and 27 substantially increase the available storage space at the rear of the body by utilizing all of the area between the sides and fenders to the lowest permissible limit.

The spare wheel 35 is mounted rearwardly of the seat at a slight angle thereto, having the lower end resting in an arcuate recess 36 in the floor panel forwardly of the kick-up portion 16, being retained in position by a strap 36 having the lowest end 37 releasably secured in a bracket 38 and the opposite end secured by a bolt 39 to a bracket 41. When the wheel is removed from the compartment, the strap 36 may also be removed so that additional luggage area is provided within the luggage compartment when the spare wheel is not carried therein. A shelf 42 may be provided between the spare wheel 35 and rear seat 14 in which articles may be stored. The top of the luggage compartment is closed in the usual manner by a panel 43 which forms a shelf interiorly of the body rearwardly of the rear seat 14. The rear deck door 12 is supported in the usual manner by hinges 44 at the top edge and is locked in closed position by a suitable locking mechanism 45 at the bottom edge of the door.

The rear axle 19 is driven through a differential in the housing 46 in the usual manner, the axle housing 47 being suspended on leaf springs 48 which are attached to the side rails 25 of the chassis frame. Where it has been the practice heretofore to extend the floor panel from the kick-up portion 16 directly to the edge of the deck door and to mount a tire horizontally upon the floor or vertically along the side of the compartment, the dropping of the floor panel to the lowest permissible limits, mounting the fuel tank away from under the luggage compartment floor, and mounting the wheel against the back seat increases the available luggage area substantially. All of this area is available for the storage of luggage since the additional compartments 26 and 27 provided at the sides thereof store the accessories for the car. This protects the luggage and other articles against damage which might occur from the scraping of accessories thereagainst when the car is in motion.

In Fig. 6, a further form of the invention is illustrated, that wherein a recess 51 is provided forwardly of the kick-up portion 16 of sufficient depth to permit the rear wheel 35 to be mounted directly against the back of the rear seat 14. This is possible where sufficient clearance is provided between the pinion housing 47 and the wheel or between the pinion housing and drive shaft and the chassis frame. A recess of sufficient depth may be provided to mount the spare wheel against the seat where the differential housing 47 is disposed laterally of the center line of the body, as illustrated in Fig. 7.

In the structure illustrated in Fig. 7, the side rails 53 of the chassis frame are extended outwardly at 54 rearwardly of the rear wheels 15 and then longitudinally of the body at 55 to provide an uninterrupted area for the luggage compartment rearwardly of the rear wheels 15. When the offset portion 55 of the chassis rails 53 prevents the attachment of a leaf spring thereto for supporting the axle housing 47, heavy coil springs 56 may be employed between the cross members 57 and the axle housing for providing spring suspension for the body on the wheels. The extending portions 55 of the side rails 53 provide a direct support for the frontwardly projecting ends 58 of a rear bumper 59. This connection is made by bolts 61 passing through elements 62 which may be of rubber, metal and the like.

In Figs. 7, 8 and 9, an alternate method of mounting the wheel 35 in the kick-up recess 63 in the downwardly offset floor panel 18 is illustrated. A cable 64 is wound on a drum 65 or directly on the shaft 66 within a housing 67. The shaft is provided with a head 68, the same as the heads on the nuts for securing the wheel 15 to the supporting flange so that a wrench 69 for tightening and removing the wheel nuts may be employed for operating the shaft 66. The head 68 may extend through the rear sill 24 and body portion 21 above the bumper 59 or the shaft may be so disposed that the head projects within the luggage compartment in a position to be operated by the wrench 69 when the compartment door is open. The free end of the cable 64 is provided with a crossbar 71 which is insertable at an angle through the central wheel opening and when disposed parallel thereto engages the flange about the opening for supporting the wheel when the shaft 66 is rotated to wind up the cable. A ratchet wheel 72 is secured to the shaft 66 having teeth engageable by the teeth of a pawl 73 which retains the wheel in raised position. A pin 74 may be inserted through the housing and shaft after the wheel is raised to lock the shaft against the turning movement should the pawl 73 become released. A pin may be mounted directly on the shaft in position to engage the bottom edge of the rear deck door 12 which prevents the shaft from turning when the deck door is closed. The hoisting drum 65 could be lowered into the recess formed by the dish of the spare wheel to provide a flush surface for the offset floor 63 of the luggage compartment. Any dirt and grime upon the tire which has become flat will not be carried into the luggage compartment when the wheel is suspended in the kick-up recess 63 beneath the luggage compartment. Air can be applied to the tire by a gas station attendant without requiring the deck door to be opened, so that the spare tire can be inflated at regular intervals and not overlooked as often occurs when the spare tire is locked in the luggage compartment. When the tire has chains applied thereto, the set of chains on the spare tire may be retained thereon when the tire is raised into the recess.

In any of the constructions herein illustrated, an increased luggage compartment is provided, the cubic content of which has been substantially doubled over luggage compartments heretofore provided. The increased luggage space provides additional weight at the rear end of the car when the compartment is loaded, which is a desirable feature. The application of the storage battery in a compartment in rear of the wheel also has the advantage of removing weight from the front end of the body and adding it to the rear. With the weight more uniformly distributed and applied at the rear end of the car, great traction is provided between the treads of the rear wheel and the ground which prevents slippage and the wear of the treads.

Referring more specifically to Fig. 1, the hood 11 is of conventional form, being a stamping of substantial width and depth. A platform 76 is illustrated as resting upon the forwardly extending portion of the body or secured by hinges 77 to the rear edge of the hood. A compartment for luggage 78 is provided above the engine compartment beneath the hood which is made available when the hood is raised or which may remain closed when the platform and the hood are raised together for servicing the engine.

When the platform is an element separate from the hood, a servicing outlet 79 for the gas tank, an outlet 81 for the oil and an outlet 82 for the radiator may extend through the platform so that oil, water and gasoline may be serviced without removing the platform 76 and the luggage 78 disposed thereon. When the platform is hinged to the cover, a vertical partition 83 may be provided to prevent the luggage from shifting rearwardly when the hood is raised with the platform.

What is claimed is:

1. In an automobile body of the passenger type having a forward engine compartment, a central passenger compartment and a rear luggage compartment, said passenger compartment having a front and rear seat provided with seat and back cushions, said rear luggage compartment having a kick-up portion on the floor thereof to clear the differential of the automobile, a spare wheel, a recess forwardly of the kick-up and rearwardly of the rear seat for receiving the bottom edge of the spare wheel, and means for supporting the spare wheel substantially parallel to the plane of the back cushion of the rear seat of the vehicle.

2. In a vehicle having a rear axle and a floor containing a kick-up portion over the rear axle, a spare tire, a rear seat in said vehicle having a seat cushion and back, the area of the floor between the back of the seat and forward of said kick-up portion being recessed to receive the lower portion of the spare tire when the tire is standing upwardly in the rear of the seat back for providing increased usable luggage area rearwardly of the kick-up portion.

3. In a vehicle having a rear axle and a floor containing a kick-up portion over the rear axle, a spare tire, a rear seat in said vehicle having a seat cushion and back, the area of the floor between the back of the seat and forward of said kick-up portion being recessed to receive the lower portion of the spare tire, said recess being of sufficient depth to permit the tire to be disposed parallel to the back seat to be located out of the area of the luggage compartment rearwardly of said kick-up portion.

4. In a vehicle having a rear axle and a floor containing a kick-up portion over the rear axle, a spare tire, a rear seat in said vehicle having a seat cushion and back, the area of the floor between the back of the seat and forward of said portion being recessed to receive the lower portion of the spare tire when the tire is standing upwardly adjacent to the seat back for providing increased usable luggage area rearwardly of said kick-up portion, a metal strap for securing the tire in position against the back seat, means for releasably securing one end of the metal strap, and releasable tightening means for securing the other end of the metal strap whereby the strap may be removed when the tire is removed.

5. In a vehicle body having a floor containing a kick-up portion over the rear axle and a rear compartment, a differential through which said rear axle is driven offset from the center line of the vehicle to provide an area forwardly of the kick-up in said compartment in which a recess is formed for receiving the lower edge of a spare tire.

6. In a vehicle body having a floor containing a kick-up portion over the rear axle and a rear compartment, a differential through which said rear axle is driven offset from the center line of the vehicle to provide an area forwardly of the kick-up in said compartment in which a recess is formed for receiving the lower edge of a spare tire, and means for securing said tire in carrying position in said recess.

BROOKS WALKER.

References Cited in the file of this patent

UNITED STATES PATENTS

| Number | Name | Date |
|---|---|---|
| 1,319,901 | Richard | Oct. 28, 1919 |
| 1,321,017 | Draver | Nov. 4, 1919 |
| 1,359,483 | Boswell | Nov. 23, 1920 |
| 1,403,881 | Whitton | Jan. 17, 1922 |
| 1,494,657 | Whitton | May 20, 1924 |
| 1,521,126 | Rackham | Dec. 30, 1924 |
| 1,743,334 | Fageol | Jan. 14, 1930 |
| 1,783,424 | Hewitt | Dec. 2, 1930 |
| 1,983,767 | Mueller | Dec. 11, 1934 |
| 1,990,757 | Stiles | Feb. 12, 1935 |
| 1,998,528 | Smith | Apr. 23, 1935 |
| 2,010,270 | Lawrence | Aug. 6, 1935 |
| 2,139,807 | Dayes | Dec. 13, 1938 |
| 2,148,950 | Maier | Feb. 28, 1939 |
| 2,202,456 | Klavik | May 28, 1940 |
| 2,240,022 | Saives | Apr. 29, 1941 |
| 2,246,861 | Slack | June 24, 1941 |
| 2,271,310 | Schafer | Jan. 27, 1942 |
| 2,306,416 | Waterhouse, Jr. | Dec. 29, 1942 |
| 2,320,856 | Ehlers | June 1, 1943 |
| 2,321,239 | Pond | June 8, 1943 |
| 2,335,058 | Haltenberger | Nov. 23, 1943 |
| 2,348,053 | Bowker | May 2, 1944 |
| 2,474,991 | Stephenson et al. | July 5, 1949 |
| 2,474,992 | Stephenson et al. | July 5, 1949 |

FOREIGN PATENTS

| Number | Country | Date |
|---|---|---|
| 218,546 | Switzerland | Apr. 1, 1942 |
| 26,720 | Great Britain | Nov. 17, 1909 |
| 508,365 | Great Britain | June 26, 1939 |
| 762,366 | France | Jan. 22, 1934 |

OTHER REFERENCES

"Bignan Sport Car," pages 911 and 310, "Automotive Industries" of April 24, 1924.

"Location of Baggage Space in Intercity Buses," in "Motor Vehicle Monthly" of August 1925, page 23.

"Wolseley Hornet Saloon," page 1100, "The Autocar" of December 13, 1935.